US007692643B2

(12) United States Patent
Kawasaki et al.

(10) Patent No.: US 7,692,643 B2

(45) Date of Patent: Apr. 6, 2010

(54) CURRENT PROGRAMMING APPARATUS, ACTIVE MATRIX TYPE DISPLAY APPARATUS, AND CURRENT PROGRAMMING METHOD

(75) Inventors: Somei Kawasaki, Saitama (JP); Masami Iseki, Yokohama (JP); Fujio Kawano, Kawasaki (JP); Takanori Yamashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 865 days.

(21) Appl. No.: 11/283,743

(22) Filed: Nov. 22, 2005

(65) Prior Publication Data

US 2006/0114194 A1 Jun. 1, 2006

(30) Foreign Application Priority Data

Nov. 26, 2004 (JP) ............................ 2004-342126

(51) Int. Cl.
*G06F 3/038* (2006.01)

(52) U.S. Cl. ...................................................... 345/211

(58) Field of Classification Search .......... 345/204–213
See application file for complete search history.

(56) References Cited

U.S. PATENT DOCUMENTS

| | | | | |
|---|---|---|---|---|
| 5,723,950 | A * | 3/1998 | Wei et al. | 345/78 |
| 5,952,789 | A * | 9/1999 | Stewart et al. | 345/76 |
| 6,023,259 | A * | 2/2000 | Howard et al. | 345/76 |
| 6,373,454 | B1 * | 4/2002 | Knapp et al. | 345/76 |
| 6,535,185 | B2 * | 3/2003 | Kim et al. | 345/76 |
| 6,839,057 | B2 | 1/2005 | Iguchi | 345/204 |
| 6,975,290 | B2 | 12/2005 | Asano | 345/76 |
| 7,310,092 | B2 | 12/2007 | Imamura | 345/204 |
| 7,425,939 | B2 | 9/2008 | Asano | 345/76 |
| 2002/0195964 | A1 | 12/2002 | Yumoto | 315/169.3 |

(Continued)

FOREIGN PATENT DOCUMENTS

JP 2003-050564 2/2003

(Continued)

OTHER PUBLICATIONS

Na et al, 42.2: 1.8-inch Full-Color OEL Display for IMT2000 Terminals, 2002, Society for Information Display, SID 02 Digest, pp. 1178-1181.*

*Primary Examiner*—Richard Hjerpe
*Assistant Examiner*—Dorothy Webb
(74) *Attorney, Agent, or Firm*—Fitzpatrick, Cella, Harper & Scinto

(57) ABSTRACT

An active matrix type display apparatus includes a plurality of pixel circuits each having an electroluminescent element EL, a 1st FET to control a current flowing in the EL, and a 2nd FET provided between a gate and a drain of the 1st FET. The plurality of pixel circuits are arranged in a matrix and have every column connected to a data line. The 2nd FET is turned on for a predetermined time period, and an image data current flowing in the data line is supplied to the gate and drain of the 1st FET, thereby writing a current value of the image data current. A preliminary charging circuit is connected to the data line. Before the writing operation in the predetermined time period is expired, a current of a predetermined current value is applied to the image data current so that a gate-source voltage of the 1st FET is equal to or larger than a threshold value.

6 Claims, 5 Drawing Sheets

U.S. PATENT DOCUMENTS

| | | | | |
|---|---|---|---|---|
| 2003/0043131 | A1 | 3/2003 | Iguchi | 345/204 |
| 2004/0108998 | A1 | 6/2004 | Imamura | 345/204 |
| 2004/0183752 | A1 | 9/2004 | Kawasaki et al. | 345/20 |
| 2004/0196275 | A1 * | 10/2004 | Hattori | 345/204 |
| 2004/0227749 | A1 * | 11/2004 | Kimura | 345/211 |
| 2005/0122150 | A1 | 6/2005 | Iseki et al. | 327/215 |
| 2005/0218821 | A1 | 10/2005 | Asano | 315/169.3 |
| 2005/0285151 | A1 | 12/2005 | Kawasaki | 257/213 |
| 2006/0114195 | A1 | 6/2006 | Yamashita et al. | 345/76 |
| 2006/0132395 | A1 | 6/2006 | Kawasaki et al. | 345/75.2 |
| 2008/0001828 | A1 | 1/2008 | Black et al. | 343/702 |
| 2008/0062093 | A1 | 3/2008 | Imamura | 345/77 |

FOREIGN PATENT DOCUMENTS

| | | |
|---|---|---|
| JP | 2003-076327 | 3/2003 |
| JP | 2004-004789 | 1/2004 |

* cited by examiner

CURRENT PROGRAMMING IMPERFECTION

CURRENT PROGRAMMING APPARATUS, ACTIVE MATRIX TYPE DISPLAY APPARATUS, AND CURRENT PROGRAMMING METHOD

BACKGROUND OF THE INVENTION

1. Field of the Invention

The invention relates to a current programming apparatus, an active matrix type display apparatus, and a current programming method. More particularly, the invention is preferably used in an active matrix type display apparatus using current driving type display elements.

2. Related Background Art

In an active matrix type display apparatus using electroluminescent elements, a current writing type circuit for writing and storing a drive current of a light emitting element into a driving circuit of each pixel is used. In the present specification, the operation to write and store the drive current into each pixel of such a matrix type display apparatus is called a current programming and a circuit for the current programming is called a current programming circuit.

A current programming circuit to hold a current which is supplied to a data line as a gate-source voltage of a transistor has been disclosed in FIG. 18 of the U.S. Publication No. 2002195964. Such a Patent Document discloses that when data is written into the current programming circuit, by supplying the current in the direction in which the write current is set off, gradation displays of black and low luminance level can be improved.

When the conventional current writing type pixel circuit is used, there is a case where the writing operation of an image data current cannot be stably executed in each pixel circuit. Although it will be explained in detail hereinbelow, it is because a threshold value of a driving transistor varies every pixel.

It is an object of the invention to provide a current programming apparatus, an active matrix type display apparatus, and their current programming method in which the writing operation of an image data current can be stably executed.

SUMMARY OF THE INVENTION

To accomplish the above object, according to the invention, there is provided a current programming apparatus in which a plurality of circuits each having a first field effect transistor and a switch provided between a control electrode and one main electrode of the first field effect transistor are connected to a data line, the switches of the plurality of circuits are sequentially turned on for a predetermined time period, and a data current flowing in the data line is supplied to the control electrode and the one main electrode of the first field effect transistor, thereby writing a current value of the data current into each of the plurality of circuits as a value of a voltage between the other main electrode and the control electrode of the first field effect transistor, wherein a constant current source for generating a predetermined current in the same direction as that of the data current is connected to the data line, and the constant current source supplies the predetermined current to the data line in such a manner that in the writing operation of each of the plurality of circuits, before the predetermined time period is expired, the voltage between the other main electrode and the control electrode of the first electroluminescent transistor is equal to or larger than a maximum value of threshold voltages of the first field effect transistors in the plurality of circuits.

According to the invention, there is provided an active matrix type display apparatus in which a plurality of pixel circuits each having a current driving type display element, a first field effect transistor to control a current flowing in the current driving type display element, and a switch provided between a control electrode and one main electrode of the first field effect transistor are arranged in a matrix, the plurality of pixel circuits arranged in the column direction are connected to one data line, the switches of the pixel circuits connected to the one data line are sequentially turned on for a predetermined time period, and an image data current flowing in the data line is supplied to the control electrode and the one main electrode of each of the first field effect transistors of the pixel circuits, thereby writing a current value of the image data current into each of the pixel circuits as a value of a voltage between the other main electrode and the control electrode of the first field effect transistor, wherein a constant current source for generating a predetermined current in the same direction as that of the image data current is connected to the data line, and the constant current source supplies the predetermined current to the data line in such a manner that in the writing operation of each of the pixel circuits, before the predetermined time period is expired, the voltage between the other main electrode and the control electrode of the first field effect transistor is equal to or larger than a maximum value of threshold voltages of the first field effect transistors in the plurality of pixel circuits arranged in the column direction.

According to the invention, there is provided a current programming method in which a plurality of circuits each having a first field effect transistor and a switch provided between a control electrode and one main electrode of the first field effect transistor are connected to a data line, the switches of the plurality of circuits are sequentially turned on for a predetermined time period, and a data current flowing in the data line is supplied to the control electrode and the one main electrode of the first field effect transistor, thereby writing a current value of the data current into each of the plurality of circuits as a value of a voltage between the other main electrode and the control electrode of the first field effect transistor, wherein a constant current source for generating a predetermined current in the same direction as that of the data current is further connected to the data line, and the predetermined current is supplied from the constant current source to the data line in such a manner that in the writing operation of each of the plurality of circuits connected to the data line, before the predetermined time period is expired, the voltage between the other main electrode and the control electrode of the first field effect transistor is equal to or larger than a maximum value of threshold voltages of the first field effect transistors in the plurality of circuits.

According to the invention, an influence of a stray capacitance of the data line is suppressed and the writing operation of the data current can be stabilized.

DETAILED DESCRIPTION OF THE PREFERRED EMBODIMENTS

An embodiment of the invention will be described in detail hereinbelow with reference to the drawings.

Figure 4:
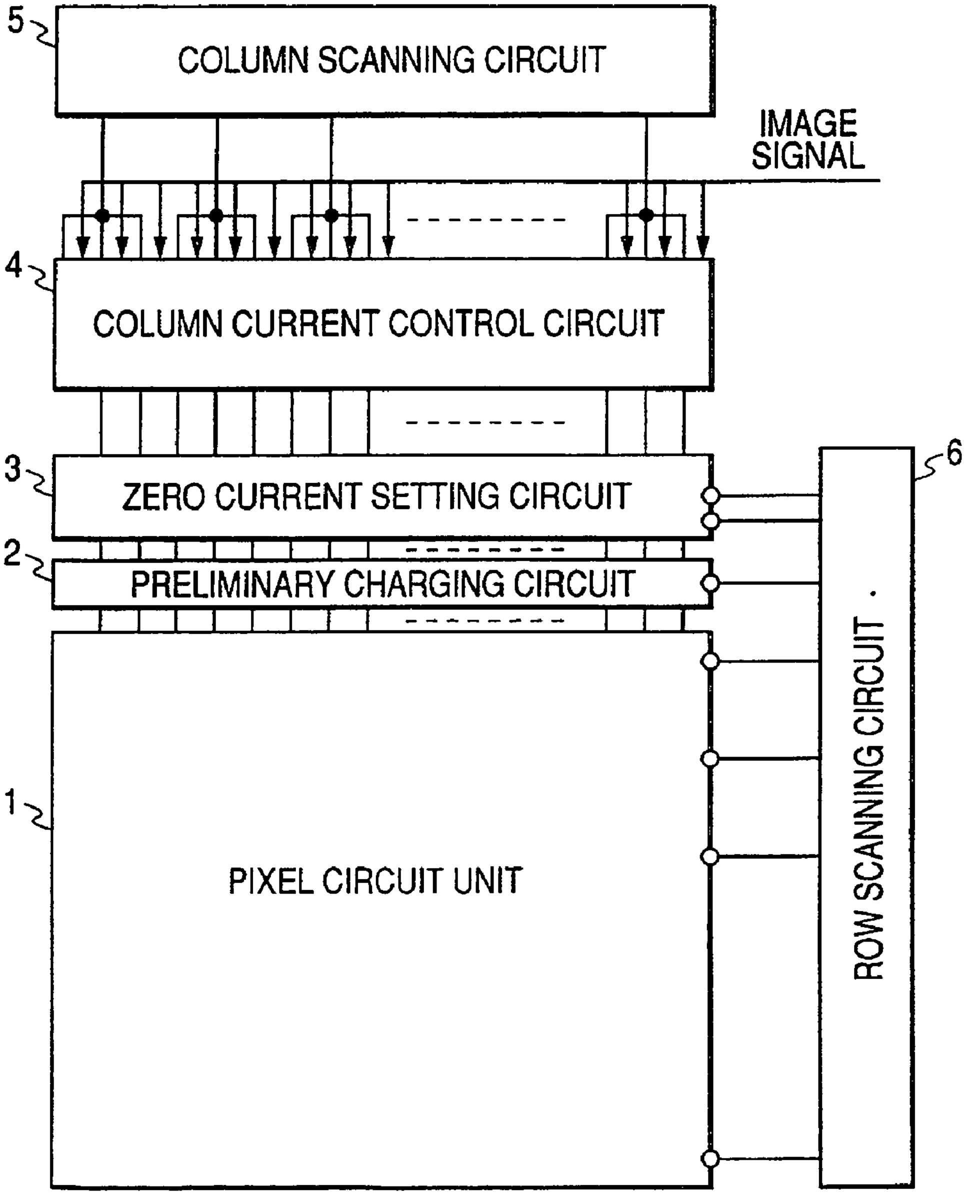
FIG. 4 is a constructional diagram showing a construction of an active matrix electroluminescent display apparatus according to the invention.

FIG. 4 is a constructional diagram showing a construction of an active matrix electroluminescent display apparatus according to the invention.

In FIG. 4, reference numeral 1 denotes a pixel circuit unit constructed by pixel circuits arranged in a matrix. In the pixel circuit unit 1, the pixel circuits and electroluminescent elements are arranged in a matrix and scanning signal lines for connecting them in the row direction and a data line for connecting them in the column direction are included.

Reference numeral 2 denotes a preliminary charging circuit serving as a current supplying circuit; 3 a zero current setting circuit; and 4 a column current control circuit. The preliminary charging circuit 2, zero current setting circuit 3, and column current control circuit 4 are formed every data line.

A charging current is written into the preliminary charging circuit 2 on the basis of a charging setting current and the preliminary charging circuit 2 supplies the current to the data line at predetermined timing. A current based on a zero setting current (reference current) is written into the zero current setting circuit 3 and the zero current setting circuit 3 supplies the current to the data line at predetermined timing. The column current control circuit 4 supplies a data current, a zero setting current, and a charge setting current to a plurality of pixel circuits in the column direction connected by the data line, the preliminary charging circuit 2, and the zero current setting circuit 3, respectively.

Reference numeral 5 denotes a column scanning circuit for sampling three image signals of RGB which are inputted to the column current control circuit 4 every column and 6 indicates a row scanning circuit which is connected to the pixel circuits arranged in the row direction and sequentially outputs row scanning signals P1m and P2m every row (assuming that there are M row scanning signal lines, m is an integer of 1 to M). In the example of the pixel circuits shown in the following embodiment, since each pixel circuit has two row selection signal lines, it is also assumed here that there are two row scanning signals. However, the invention is not limited to the case where there are two row selection signal lines but can be also applied to the case where the number of row selection signal lines is equal to one, three, or the like in dependence on the pixel circuits.

Figure 1:
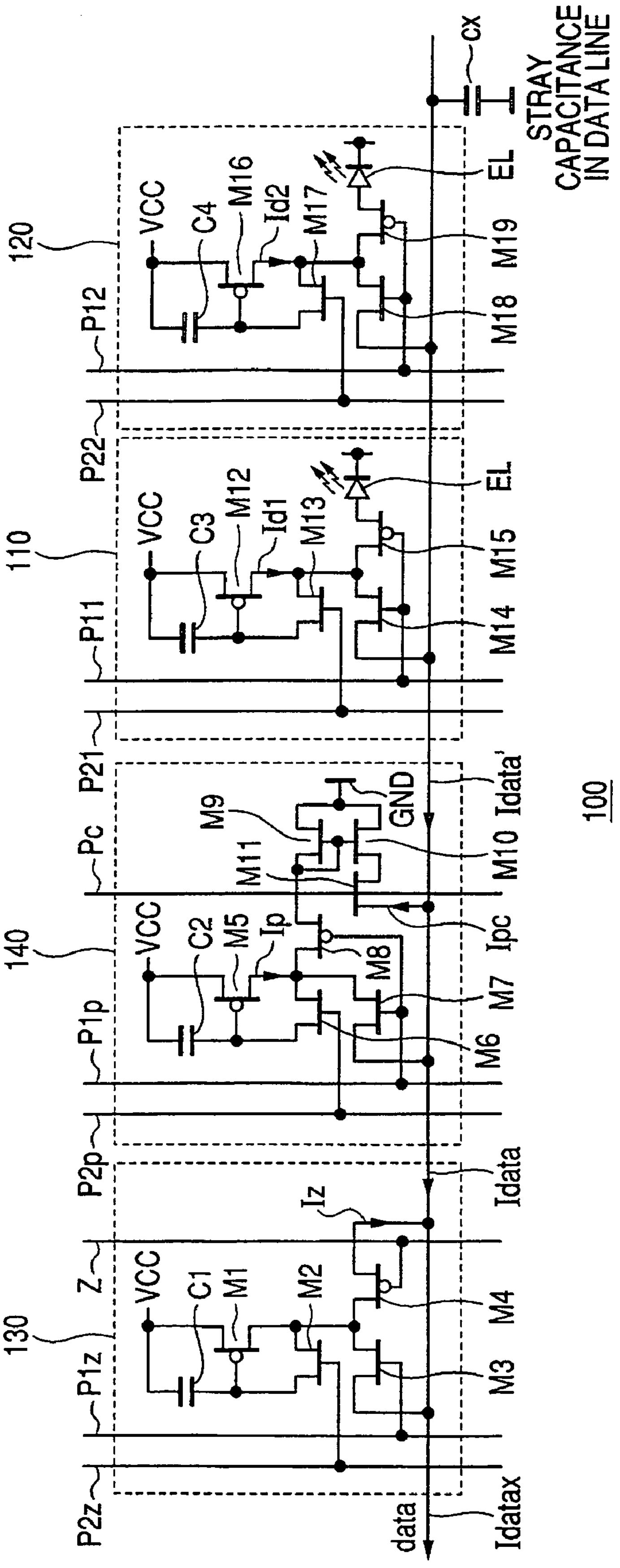
FIG. 1 is a diagram showing an example of a construction of pixel circuits, a zero current setting circuit, and a preliminary charging circuit according to the first embodiment of the invention.

FIG. 1 shows a current programming circuit according to the first embodiment of the invention. A current programming circuit 100 of the embodiment includes: a first row pixel circuit 110; a second row pixel circuit 120 (although a third row pixel circuit, a fourth row pixel circuit, . . . follow, they are omitted in FIG. 1); a zero current setting circuit 130; and a preliminary charging circuit 140. Although only the programming circuit connected to one data line is shown in FIG. 1, naturally, there are a plurality of data lines and the same programming circuit exists for every data line in the matrix display apparatus of FIG. 4.

Figure 2:
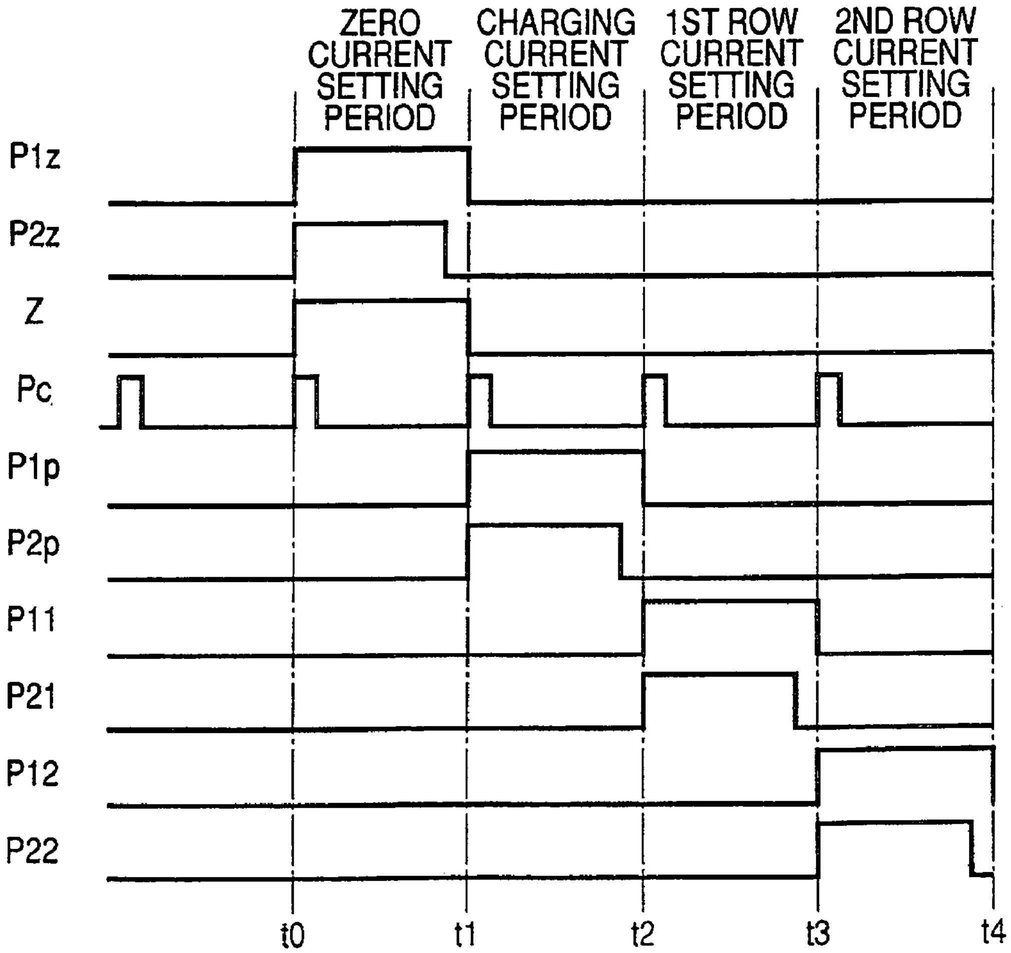
FIG. 2 is a timing chart for explaining the operation of each circuit according to the first embodiment of the invention.

FIG. 2 is a timing chart for explaining the operation of the circuit shown in FIG. 1. FIG. 2 shows time-dependent changes of the signals which are inputted to signal lines P1z, P2z, . . . in FIG. 1. An axis of ordinate indicates a voltage value of each signal and an axis of abscissa shows time.

Figure 3:
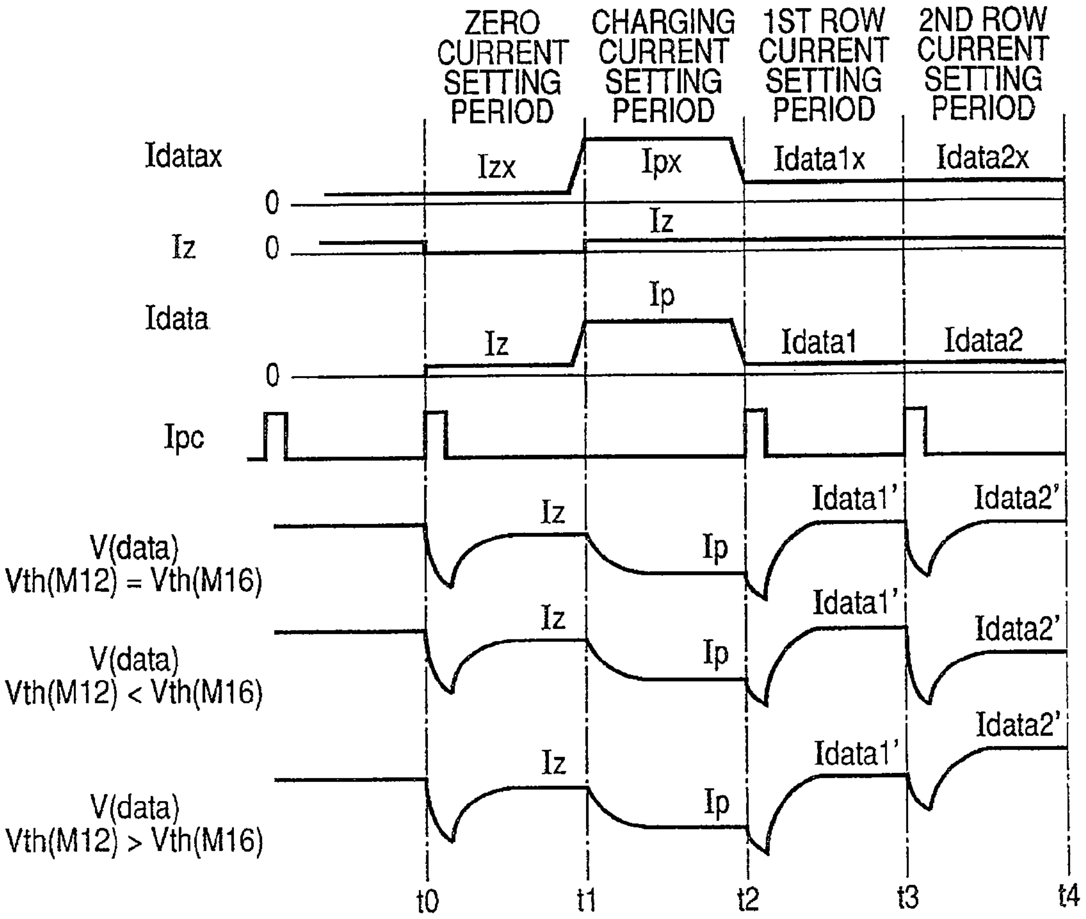
FIG. 3 is a timing chart showing changes in data currents, a charging current, and an electric potential of a data line.

FIG. 3 is timing chart showing a change in each of a total current "Idatax" flowing in a data line "data" in FIG. 1, a data current "Idata" flowing in the data line of the portion connected to the pixel circuits, an output current "Iz" of the zero current setting circuit 130, a charging current "Ipc" which is generated by the preliminary charging circuit 140, and an electric potential "V(data)" of the data line. As "V(data)", three kinds of voltages according to a difference between magnitudes of a threshold value Vth(M12) of a driving transistor M12 of the first row pixel circuit 110 and a threshold value Vth(M16) of a driving transistor M16 of the second row pixel circuit 120 are shown.

Figure 5:
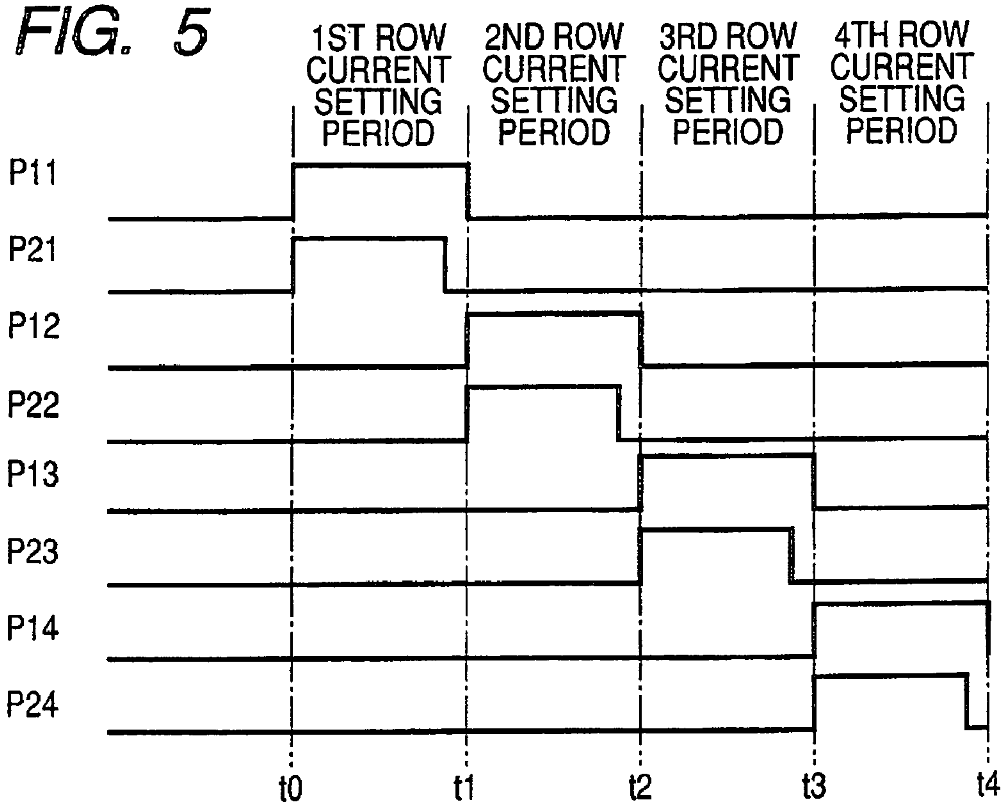
FIG. 5 is a timing chart for explaining the operation of the pixel circuit in the case where the preliminary charging circuit is not provided as a comparison example.
Figure 6:
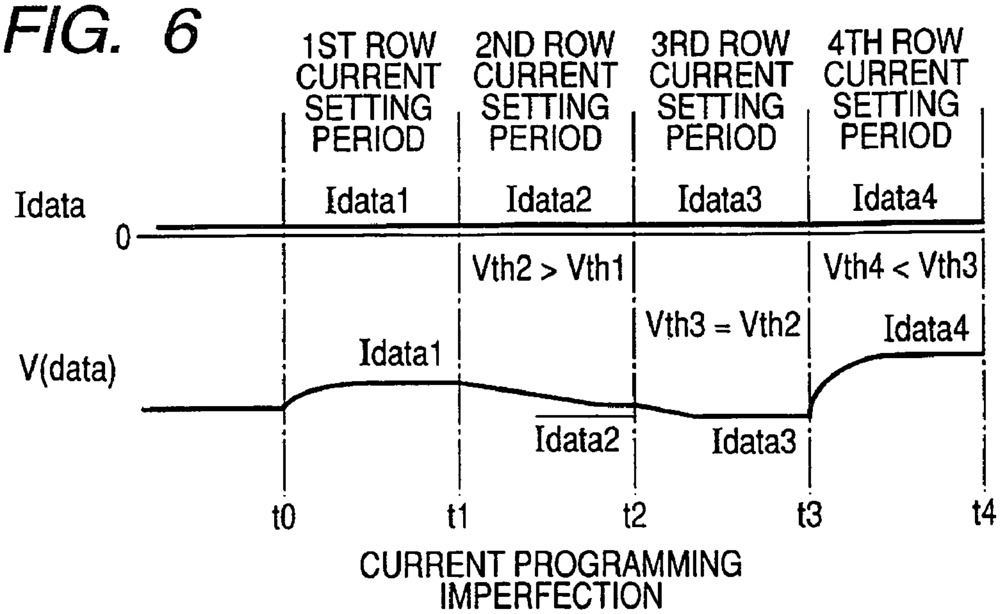
FIG. 6 is a timing chart showing changes in the data current and the electric potential of the data line in the case where the preliminary charging circuit is not provided.

FIGS. 5 and 6 are timing charts when the programming circuit 100 in the case where the preliminary charging circuit 140 is not provided is presumed as a comparison example of the embodiment. P11, P12, P21, and P22 denote signals of the row selection signal lines of the first and second row pixel circuits 110 and 120 designated by the same reference numerals as those shown in FIG. 1. P13 to P24 similarly denote signals of the row selection signal lines of the third and fourth row pixel circuits (not shown).

First, for easy understanding of the invention, the drive current programming operation of the programming circuit 100 and the subsequent light emitting operation in the case where the preliminary charging circuit 140 is not provided will be described with reference to FIGS. 1 and 5. Explanation will be made here while omitting the operation of the zero current setting circuit 130 also. In the embodiment, the pMOS transistors M12 and M16 correspond to the first field effect transistors, their gates correspond to control electrodes, their sources and drains correspond to main electrodes, and nMOS transistors M13 and M17 correspond to switches, respectively.

The operation of the first row pixel circuit 110 connected to the data line "data" in FIG. 1 will now be considered.

In FIG. 5, when the row scanning signal P11 is set to the high level, an nMOS transistor M14 serving as a switch for the first program (row selection) is turned on and a pMOS transistor M15 serving as a switch for selecting light emission is turned off. When the row scanning signal P21 is set to the high level, the nMOS transistor M13 serving as a switch for the second program is turned on.

Thus, an image data current Idata' flowing in the data line is led to the gate and drain of the pMOS transistor M12 serving as a driving transistor, thereby charging a capacitor C3 connected between the gate and source. When the voltage between the gate and source of the transistor M12 exceeds a threshold value, the transistor M12 is turned on and the data current Idata' flows as a drain current of the transistor M12. Therefore, a drain terminal voltage and the data line voltage V(data) are determined by a value of this current. The capacitor C3 stores the data current Idata' as a voltage value.

When the row scanning signal P21 is set to the low level for a predetermined time period, the nMOS transistor M13 serving as a switch for the second program is turned off and the voltage of the capacitor C3 is held. A period of time during which the transistor M13 is ON is a drive current programming period of the first row pixel circuit.

Subsequently, when the row scanning signal P11 is set to the low level, the nMOS transistor M14 serving as a switch for the first program (row selection) is turned off and the pMOS transistor M15 serving as a switch for selecting the light emission is turned on. Thus, the current which is determined by the voltage held in the capacitor C3 (that is, the voltage between the gate and source of the transistor M12 for driving) flows into an electroluminescent element EL from the drain of the pMOS transistor M12.

In this manner, the image data current Idata' controls the current flowing in the electroluminescent element EL through the voltage held in the capacitor C3.

When the first row current setting period is expired, the second row current setting period is started and the drive currents are sequentially written for a current setting period of each row on the basis of the image data signals.

The electroluminescent element EL maintains the light emission for a period of time until the next current writing operation, that is, for a period of time during which the current is written into another row pixel circuit and for a vertical blanking time (blanking period of time) after the writing scan was finished. The period of time during which the light emission is executed (non-light emission in the case of a black display) is a light emitting period. When the first row current setting period is expired, the second row current setting period is started and the drive currents are sequentially written on the basis of the image data signals for the current setting period of each row.

Fundamentally, it is effective to control each pixel circuit by the foregoing current programming in terms of a point that the operation is not influenced by a variation in characteristics of the driving transistors. However, ordinarily, a stray (parasitic) capacitance such as overlap with other wiring, capacitance across the terminals of the connected transistor, or the like certainly exists in the data line. The programming operation of a small current is made unstable due to such a stray capacitance. According to the observation by the inventors et al. of the present invention, a blackish beat occurs in a low luminance region. Since such a phenomenon is caused by the existence of the stray capacitance and a variation in characteristics of the driving transistors arranged on a panel, it becomes a fixed pattern noise, appears as a conspicuous phenomenon, and deteriorates picture quality. Such a phenomenon becomes further remarkable due to the realization of high efficiency of the large display screen panel and EL elements in which the stray capacitance of the data line increases.

The above phenomenon will be described hereinbelow with reference to FIGS. 1, 5, and 6.

There is considered the case where in the programming circuit of FIG. 1, the first row pixel circuit 110 to the fourth row pixel circuit (not shown) are connected to the data line "data" and the programming of the drive currents in the first to fourth row pixel circuits is executed in the first to fourth current setting periods shown in FIG. 5, respectively.

It is assumed that all of the image data currents. "Idata" have the same current value, that is, $$Idata1=Idata2=Idata3=Idata4$$

the display of a low luminance level is performed, and the current value is very small. Threshold voltages of the pMOS transistors M12, M16, etc. serving as driving transistors of the first to fourth row pixel circuits are labeled as Vth1, Vth2, Vth3, and Vth4. It is assumed that there is a variation of their values and there are relations such that Vth2>Vth1,
Vth3=Vth2, and
Vth4<Vth3 among them.

When the nMOS transistors M14 and M13 are turned on for the first row current setting period (t0-t1), the gate of the driving transistor M12 of the first row pixel circuit is connected to the data line.

Now assuming that a data line electric potential V(data) before time t0 is sufficiently low as an initial state, a voltage over Vth1 is soon applied across the gate and source, so that the transistor is turned on and a source-drain current Id1 flows.

As the source-drain current Id1 approaches the image data current Idata1, the gate potential is converged to a predetermined electric potential, so that the image data current Id1 is written as a voltage between the gate and source. At this time, the electric potential V(data) of the data line is determined by a value of the drain current of the driving transistor M12.

In the present case, since the drain current Idata1 is very small, the voltage between the source and drain is also small. Therefore, it is possible to consider that the time-dependent change of V(data) in the period t0-t1 reaches a balanced state of an electric potential which is lower than Vcc by about Vth1. This electric potential is written as "Idata1" in FIG. 6 indicating that the potential is determined in correspondence to the current Idata1.

A second row current setting period (t1-t2) will now be described.

When nMOS transistors M17 and M18 of the second row pixel circuit are turned on, the gate of the driving transistor M16 is connected to the data line. However, the data line at this time is set to the data line potential at the end of the first current setting period, to-t1, that is, the electric potential shown by Idata1 in the plot of V(data) in FIG. 6. As mentioned above, this potential is lower than Vcc by Vth1.

Since the threshold value Vth2 of the driving transistor M16 of the second row pixel circuit is lower than Vth1 (Vth2>Vth1) the driving transistor M16 is not soon turned on and the source-drain current does not flow. Therefore, the gate potential of M16, that is, the data line potential is not determined by M16 but is specified by the electric potential of a stray capacitor Cx of the data line.

Although the electric potential Vdata of the data line decreases gradually by the small data current, since the stray capacitance of the data line is large, its decreasing rate is small. Within the second row current setting period (t1-t2), the voltage between the gate and source of the driving transistor M16 does not exceed Vth2 and the transistor M16 is held in the OFF state. Therefore, the writing of the current into a voltage of a capacitor C4 based on the image data current Idata2 (=Idata1) cannot be executed. Such a state is called "current programming imperfection".

Also in the third row current setting period (t2-t3), the electric potential Vdata of the data line and the gate potential of a driving transistor (not shown in FIG. 1) of the third row pixel circuit subsequently decrease by Idata3. When the voltage between the gate and source exceeds Vth3 (Vth3=Vth2), the source-drain current of the driving transistor flows, the gate potential is converged to a predetermined electric potential, and the current based on the image data current Idata3 (Idata3=Idata2) is written as a voltage between the gate and source. When the stray capacitance Cx of the data line is further large, there is also a case where the current programming imperfection occurs also in the third row pixel circuit.

Subsequently, since the threshold voltage Vth4 of the driving transistor is smaller than Vth3 (Vth4<Vth3) in the fourth row current setting period (t3-t4), the data line potential is lower than (Vcc-Vth4) when a switch of the fourth row pixel circuit is turned on. Thus, the driving transistor of the fourth row pixel circuit is soon turned on, the source-drain current flows, and the current programming is executed.

The current programming imperfection in the second row current setting period occurs because the voltage between the gate and source of the driving transistor M16 does not exceed the threshold voltage of the driving transistor in the current setting period (t1-t2).

Even if it exceeds the threshold value, when the drain current of the driving transistor M16 is very small and the charging/discharging of the stray capacitor Cx of the data line is not completed, the drain current does not coincide with Idata. Therefore, the voltage is not accurately written into the capacitor C4 of the pixel.

To perfectly execute the current programming, after the turn-on of the driving transistor, it is necessary to assure a time enough to allow the drain current to complete the charging/discharging into/from the stray capacitor within the current setting period.

In the embodiment, a current supplying circuit is provided for charging the stray capacitor of the data line by the predetermined current for a predetermined time period before the current programming operation by the current data is expired. This predetermined current supplied by the current supplying circuit sets the voltage between the gate and source of the driving transistor equal to or larger than the threshold voltage with respect to all of the rows by the charging operation. Consequently, in the current programming operation in the small current, the self-discharging operation of the driving transistor of each pixel is guaranteed and the current programming operation is improved.

An embodiment of the invention will be described hereinbelow with reference to FIGS. 1 to 3. As shown in FIG. 2, the zero current setting period to set the zero current into the zero current setting circuit exists before the charging current setting period. The zero current setting circuit and the zero current setting period will be explained hereinafter. The charging current setting period and the current setting period of each pixel circuit will now be described.

The preliminary charging circuit 140 serving as a current supplying circuit shown in FIG. 1 is a constant current source for supplying a predetermined current for a predetermined time period in the current setting periods of the pixel circuits 110, 120, etc. of each row. The preliminary charging circuit 140 generates the current in the same direction as that of the image data current on the data line. The predetermined time period and the predetermined current denote the period and current value which do not depend on the magnitude of the data current and are common in a plurality of pixel circuits.

The preliminary charging circuit 140 in FIG. 1 is constructed by: a current setting circuit portion (portion on the left side from M8) with the same construction as that of each pixel circuit; and a current mirror circuit portion (portion on the right side from M8 excluding M8) including the switch.

In the pixel circuit in which the current programming is imperfect, the period until the current writing operation is expired is long and exceeds the current setting period of the pixel circuit.

In order to shorten the time until the voltage between the gate and source of the driving transistor exceeds the threshold value, the preliminary charging circuit 140 serving as a current supplying circuit adds a predetermined current to the image data current before the current writing operation in the current setting period of the pixel circuit is expired, in other words, before the gate potential is converged to the predetermined value. In order to assure the long enough current writing period after the gate-source voltage exceeds the threshold value, as shown in FIGS. 2 and 3, it is desirable to add the predetermined current to the image data current just after the start of the current setting period of the pixel circuit.

The current value of the predetermined current which is supplied from the preliminary charging circuit is set as follows in consideration of the variation of the threshold voltages of the driving transistors.

To eliminate the current programming imperfection by the preliminary charging, a preliminary charging current sufficient to turn on the driving transistors has to be set in all of the pixel circuits connected to the data line. That is, the preliminary charging current has to be set so that it exceeds the threshold value of the driving transistors in all of the pixel circuits connected in the column direction and becomes the maximum value of the threshold voltages of the driving transistors in the column or becomes the voltage exceeding such a value.

A period T1 during which the predetermined current is supplied has to be set to be longer than a time constant which is determined by a load capacitance of the data line (the sum of the stray capacitance Cx and the charge holding capacitance C3 of the pixel), a maximum threshold value Vth(max), and the setting value Ipc of the preliminary charging current so as to sufficiently reduce the electric potential of the data line. That is, $$T1>(Cx+C3)\cdot Vth(\max)/Ipc$$

Further, the larger the current Ipc which is supplied from the preliminary charging circuit is, the shorter the value of T1 can be set to be. Therefore, It is preferable to set Ipc to a larger value.

Actually, as shown in the embodiment, since the current Ipc is also formed by the same column current control circuit (4 in FIG. 4) as that of the data current and supplied to the preliminary charging circuit 2, Ipc can be varied only within the range of the data current in many cases. In this case, Ipc is set to a predetermined value within the variable range of the data current, preferably, a value equal to the maximum value of the data current is selected After the driving transistor is turned on, it is preferable to promptly turn off the preliminary charging current so that the writing operation by the data current is finished within the current setting period of the pixel circuit.

In other words, it is preferable to set a residual period T2 to be longer than a time constant which is determined by a voltage fluctuation range ΔVdata of the data line, the stray capacitance Cx, the capacitance C3 of the pixel circuit, and the data current Idata so that the current writing operation is completed even when the data current is small. That is, $$T2>(Cx+C3)\cdot\Delta\mathrm{Vdata}/\mathrm{Idata}.$$

A period T (t2-t3, t3-t4, or the like in FIG. 3) for the current setting of the pixel circuit of one row is constructed by the period T1 during which the preliminary charging current is added to the data current and the resultant current is supplied and the residual period T2, that is, $$T=T1+T2.$$

In the embodiment, it is not specified that the electric potential of the data line is fixed by the current supply by the preliminary charging circuit but the charging potential depends on the characteristics of the driving transistor of each pixel circuit. The preliminary charging circuit is constructed so that the predetermined current (charging current) can be generated by the data current in the vertical blanking period and the preliminary charging is executed by using, for example, the horizontal blanking period.

A charging current value Ip (drain current of the pMOS transistor M5) is decided by a method whereby the current which is supplied to the data line "data" for the predetermined vertical blanking period is subjected to the current programming (setting) to the pMOS transistor M5 in a manner similar to the pixel circuit (M6=M7=ON, M8=OFF). The preliminary charging operation by the charging current value Ip is executed in a predetermined start period (pc=1; for example, horizontal blanking period) of the current programming (setting) operation to the relevant pixel circuit which is executed in each row (each horizontal scanning period).

The current setting circuit of the preliminary charging circuit includes: an nMOS transistor M7 connected to the data line; an nMOS transistor M6 provided between a gate of the pMOS transistor M5 and the nMOS transistor M7; the pMOS transistor M5 in which a current is written as a gate-source voltage on the basis of the charging setting current flowing in the data line; and a pMOS transistor M8 provided between the pMOS transistor M5 and an nMOS transistor M9 constructing a current mirror circuit.

The current mirror circuit of the preliminary charging circuit includes: the nMOS transistor M9 whose source and gate are connected; an nMOS transistor M10 whose gate is connected to the gate of the nMOS transistor M9; and an nMOS transistor M11 provided between the nMOS transistor M10 and the data line.

With reference to FIGS. 1 to 3, description would be made concerning with the charging current setting operation (charging current writing operation) of the preliminary charging circuit and the drive current programming operation of the pixel circuit in the case where the current is supplied by the preliminary charging circuit, as follows.

First, the charging current setting operation (charging current writing operation) of the preliminary charging circuit will be explained.

When signals P1p and P2p are set to the high level and the nMOS transistors M7 and M6 are turned on, a gate-source voltage of a capacitor C2 connected to the gate of the pMOS transistor M5 is set on the basis of the charging setting current Ip (=Ipx−Iz: Iz denotes a setting current from the zero current setting circuit) flowing in the data line.

Subsequently, when the signal P2p is set to the low level, the nMOS transistor M6 is turned off and the voltage of the capacitor C2 is held and written as a current value. After that, when the signal P1p is set to the low level, the nMOS transistor M7 is turned off and the pMOS transistor M8 is turned on.

The drive current programming operation of the pixel circuit in the case where the current is supplied by the preliminary charging circuit will be described.

For example, when the signal Pc is set to the high level in the second row current setting period, in the preliminary charging circuit, a source-drain current flows by the gate potential of the pMOS transistor M5. The source-drain current is current-mirror processed and the charging current Ipc flows through the nMOS transistor M11.

For a period of time during which the signal Pc in the second row current setting period is at the high level, the charging current Ipc flows so as to increase the image data current flowing in the data line. Thus, a current Idata1' (=Idata1+Ipc, Idata1=Idata1x−Iz: Iz denotes the setting current from the zero current setting circuit) flows. Therefore, the electric potential of the data line drops and, at the same time, since the nMOS transistors M17 and M18 are ON in the second row current setting period, a gate potential of the pMOS transistor M16 serving as a driving transistor also drops.

The source-gate voltage of the driving transistor exceeds the threshold voltage Vth, in each current setting period of each pixel circuit, by allowing the charging current Ipc to flow so as to increase the image data current flowing in the data line and decreasing the gate potential as mentioned above, even if there is a variation of the threshold voltages Vth of the driving transistors of the pixel circuits. The self-discharging operation of the driving transistor of each pixel is guaranteed and the current programming operation is improved.

Explanation will be further made with reference to FIG. 3.

It is now assumed that all of the image data currents are the small currents having the same current value (currents in the low gradation or black display state) (Idata1x=Idata2x).

The threshold voltages of the pMOS transistors M12 and M16 serving as driving transistors of the first row pixel circuit and the second row pixel circuit are labeled as Vth1 and Vth2 and it is assumed that there is a relation of Vth1<Vth2 between the voltage levels of the threshold voltages.

It is now assumed that the current programming operation has normally been executed in the first row current setting period. When the voltage levels of the threshold voltages of the pMOS transistors M12 and M16 have the relation of Vth1 (M12)<Vth2 (M16), in the case where no current is supplied to the data line by the preliminary charging circuit, as already described above, the gate-source voltage of the driving transistor M16 does not exceed Vth2 in the second row current setting period due to an influence of the stray capacitor Cx of the data line, and the current writing operation based on the image data current Idata2 (=Idata2x−Iz: Iz denotes the setting current from the zero current setting circuit), that is, the current programming cannot be executed (current programming imperfection occurs).

However, by supplying the current Ipc to the data line by the preliminary charging circuit as in the embodiment, as shown in FIG. 3, even when Vth1 (M12)<Vth2 (M16), for the period of time during which the signal Pc in the second row current setting period is at the high level, the electric potential of the data line drops, and at the same time, the nMOS transistors M18 and M17 are ON in the second row current setting period, so that the voltage exceeding Vth is applied as a gate-source voltage to the gate of the driving transistor M16 of the second row pixel circuit and the source-drain current flows. After that, the signal Pc is set to the low level, the gate potential rises and is converged to the predetermined potential, and the current based on an image data current Idata2' (=Idata2x−Iz+Ipc: Iz denotes the setting current from the zero current setting circuit) is written as a gate-source voltage.

FIG. 3 also shows the cases where the voltage levels of the threshold voltages of the pMOS transistors M12 and M16 are set to Vth1 (M12)=Vth2 (M16) and to Vth1 (M12)>Vth2 (M16).

Although the charging current setting operation (charging current writing operation) of the preliminary charging circuit and the drive current programming operation of the pixel circuit in the case where the current is supplied by the preliminary charging circuit have been described above, the zero current setting circuit as shown in FIGS. 1 and 4 is further provided in the embodiment.

In the black display, although it is desirable to set the line sequential data line current signal to the zero current, it is actually difficult to set it to the zero current in terms of the circuit construction. If the line sequential data line current signal is not set to the zero current, the drive current of the electroluminescent element EL cannot be set to zero, so that the black display cannot be sufficiently set. Therefore, the zero current setting circuit is provided to sufficiently set the black display.

The image signal voltage which is inputted to the column current control circuit 4 in FIG. 4 in the vertical blanking period is set to the zero current setting voltage (black display voltage level) and the zero setting current (reference current) is allowed to flow in the data line connected to the column current control circuit 4. This period is called a zero current setting period (zero current programming period).

When nMOS transistors M3 and M2 are turned on by setting control signals P1z and P2z to the high level for the zero current setting period, respectively, the voltage of the capacitor C1 connected to a gate of a pMOS transistor M1 is set to the zero current setting level having a correlation with the zero setting current. Upon current setting of each pixel circuit, the setting current Iz based on the zero setting current is set to the gate-source voltage enough to allow the current to flow in the data line through pMOS transistors M1 and M4. Subsequently, when the control signals P1z and P2z to the low level, the voltage of the capacitor C1 is held.

Subsequently, assuming that the data current Idata1x flows in the data line in order to set the first row pixel circuit to the image display (for example, black display), the setting current Iz flows in the data line from the zero current setting circuit through the pMOS transistors M1 and M4. A write setting current Idata1 of the first row pixel circuit is set to Idata1=Idata1x−Iz. By providing the zero current setting circuit as mentioned above, the black display between the pixel circuits can be set.

Although the capacitors C1 to C4 can be individually formed as capacitive elements, a stray capacitor (overlap capacitor or the like of a gate electrode and a source region) formed between the gate and source can be also used instead of forming each capacitor as an element.

Although the active matrix type display apparatus using the current driving type display elements has been described above as an example using the current programming apparatus according to the invention, the current programming apparatus according to the invention can be also applied to an apparatus using a current setting circuit for holding the current which is allowed to flow in the data line as a gate-source voltage of the transistor. Such an application is not limited to the active matrix type display apparatus using the current driving type display elements such as LEDs, electroluminescent elements, electron-emitting devices (since the display can be performed by accelerating an electron emitted from the electron-emitting device and bombarding it onto an image forming member such as phosphor or the like, such an electron-emitting device is also incorporated in the current driving type display elements), or the like, but the current programming apparatus is used as a circuit for the current programming of an analog memory or the like. The invention is not limited to the matrix-shaped display apparatus but can be also applied to a line-shaped display apparatus.

Although it is not always necessary to provide the zero current setting circuit in the embodiment, it is preferable to provide it in order to more accurately make the setting of the black display. Since the current from the preliminary charging circuit is applied for a partial period until the current writing operation is finished within the current setting period, it does not remain finally as a current value as a gate-source voltage. Therefore, even if it exists together with the current by the zero current setting circuit, its function is not deteriorated.

The invention is not limited to the active matrix type display apparatus using the current driving type light-emitting elements such as electroluminescent elements, (EL elements) or the like but is also used for the analog memory.

This application claims priority from Japanese Patent Application No. 2004-342126 filed on Nov. 26, 2004, which is hereby incorporated by reference herein.

What is claimed is:

1. An active matrix type display apparatus, comprising:

a plurality of pixel circuits, respective pixel circuits having the same circuit topology and connected to one data line in a row, and each pixel circuit having a current driving type display element, a first field effect transistor to control a current flowing in said current driving type display element, and a switch provided between a control electrode and one main electrode of said first field effect transistor arranged in a matrix, said plurality of pixel circuits arranged in a column direction being connected to said one data line, said switches of said pixel circuits connected to said one data line are sequentially turned on for a predetermined time period, and an image data current flowing in said data line is supplied to said control electrode and said one main electrode of each of said first field effect transistors of said pixel circuits, thereby writing a current value of said image data current into each of said pixel circuits as a value of a voltage between an other main electrode and said control electrode of said first field effect transistor; and preliminary charging circuits provided on respective rows of the pixel circuits, and each of the preliminary charging circuits connected to a corresponding data line, wherein each of the preliminary charging circuits comprises a field effect transistor, a switch provided between a control electrode and one main electrode of the field effect transistor, and a capacitor provided between the control electrode and the other main electrode of the field effect transistor, each of the preliminary charging circuits is adapted to:

during a vertical blanking period, be programmed to generate a predetermined current by an operation that a current flowing in the connected data line is supplied to the field effect transistor and a gate-to-source voltage of the field effect transistor is held in the capacitor, during each horizontal blanking period, apply the predetermined current to the connected data line in the same direction as the image data current, and set a voltage between the other main electrode and the control electrode of the first field effect transistor of the pixel circuit, which is connected to the connected data line and selected by a scan line, to a voltage equal to or greater than thresholds of a plurality of the first field effect transistors of the plurality of pixel circuits connected to the connected data line.

2. An apparatus according to claim 1, wherein the current which is supplied to said data line and sets the predetermined current of said preliminary charging circuit is a current within a variable range of the data current.

3. An apparatus according to claim 1, wherein the current which is supplied to said data line and sets the predetermined current of said preliminary charging circuit is a maximum current within the variable range of the data current.

4. An apparatus according to claim 1, further comprising:

a second switch provided between said switch of each of said pixel circuits and said data line; and a third switch which is connected to said one main electrode of said first field effect transistor of each of said pixel circuits and extracts the written current from said one main electrode of each of said pixel circuits in a time period out of the predetermined time period.

5. An apparatus according to claim 1, wherein said current driving type display element is an electroluminescent element which emits light in correspondence to an injection current.

6. A current programming method, comprising the steps of:

at a plurality of pixel circuits, respective pixel circuits having the same circuit topology and connected to a data line in a row, each having a first field effect transistor and a switch provided between a control electrode and one main electrode of the first field effect transistor, sequentially turning on the switches of the plurality of pixel circuits for a predetermined time period and supplying a data current flowing in the data line to the control electrode and the one main electrode of the first field effect transistor, thereby writing a current value of the data current into each of the plurality of pixel circuits as a value of a voltage between an other main electrode and the control electrode of the first field effect transistor;

at each of preliminary charging circuits provided on respective rows of the pixel circuits, and each of the preliminary charging circuits connected to a corresponding data line and comprising a field effect transistor, a switch provided between a control electrode and one main electrode of the field effect transistor, and a capacitor provided between the control electrode and the other main electrode of the field effect transistor, during a vertical blanking period, generating a predetermined current by an operation that a current flowing in the connected data line is supplied to the field effect transistor and a gate-to-source voltage of the field effect transistor is held in the capacitor, during each horizontal blanking period, applying the predetermined current to the connected data line in the same direction as the image data current, setting a voltage between the other main electrode and the control electrode of the first field effect transistor of the pixel circuit, which is connected to the connected data line and selected by a scan line, to a voltage equal to or greater than thresholds of a plurality of the first field effect transistors of the plurality of pixel circuits connected to the connected data line.

* * * * *